(12) United States Patent
Ju et al.

(10) Patent No.: US 7,798,234 B2
(45) Date of Patent: Sep. 21, 2010

(54) UMBILICAL ASSEMBLY, SUBSEA SYSTEM, AND METHODS OF USE

(75) Inventors: Gwo-Tarng Ju, Katy, TX (US); King Him Lo, Missouri City, TX (US); Thomas Lee Power, Tomball, TX (US); Rob V Von Tungeln, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/560,662

(22) Filed: Nov. 16, 2006

(65) Prior Publication Data

US 2007/0251694 A1 Nov. 1, 2007

Related U.S. Application Data

(60) Provisional application No. 60/738,356, filed on Nov. 18, 2005.

(51) Int. Cl.
*E21B 21/00* (2006.01)
*F16L 11/00* (2006.01)

(52) U.S. Cl. .................. 166/367; 166/242.1; 166/345; 138/118; 138/138; 174/47

(58) Field of Classification Search .............. 166/367; 174/47; 405/224.2, 224.4
See application file for complete search history.

(56) References Cited

U.S. PATENT DOCUMENTS

| | | | | |
|---|---|---|---|---|
| 3,212,582 A * | 10/1965 | Brown | .............. | 166/242.2 |
| 4,196,307 A * | 4/1980 | Moore et al. | .............. | 174/47 |
| 4,476,923 A * | 10/1984 | Walling | .............. | 166/66.4 |
| 4,556,340 A * | 12/1985 | Morton | .............. | 405/224.2 |
| 4,821,804 A * | 4/1989 | Pierce | .............. | 166/367 |
| 5,129,148 A * | 7/1992 | Adams et al. | .............. | 29/898 |
| 5,902,958 A * | 5/1999 | Haxton | .............. | 174/47 |
| 5,913,337 A * | 6/1999 | Williams et al. | .............. | 138/125 |
| 5,921,285 A * | 7/1999 | Quigley et al. | .............. | 138/125 |
| 6,012,495 A * | 1/2000 | Antonsen | .............. | 138/131 |
| 6,046,404 A | 4/2000 | Figenschou et al. | .............. | 174/47 |
| 6,082,063 A * | 7/2000 | Shrive et al. | .............. | 52/223.13 |
| 6,146,052 A * | 11/2000 | Jacobsen et al. | .............. | 405/169 |
| 6,239,363 B1 * | 5/2001 | Wooters | .............. | 174/47 |
| 6,283,206 B1 * | 9/2001 | Fraser et al. | .............. | 166/242.3 |
| 6,355,879 B1 * | 3/2002 | Bertini et al. | .............. | 174/47 |
| 6,472,614 B1 | 10/2002 | Dupont et al. | .............. | 174/705 |
| 6,538,198 B1 * | 3/2003 | Wooters | .............. | 174/47 |
| 6,612,370 B1 * | 9/2003 | Jahnsen et al. | .............. | 166/367 |
| 6,940,054 B1 | 9/2005 | Heggdal | .............. | 219/629 |

(Continued)

FOREIGN PATENT DOCUMENTS

GB 2326177 A * 12/1998

(Continued)

OTHER PUBLICATIONS

Ellen C. Moore, "Subsea Systems Move Into the Ultra-Deep", dated Oct. 2, 2008, Hart.

*Primary Examiner*—Thomas A Beach
(74) *Attorney, Agent, or Firm*—William E. Hickman

(57) ABSTRACT

There is disclosed an umbilical assembly comprising at least one elongated umbilical element, and at least one light weight, high strength reinforcing rod.

6 Claims, 3 Drawing Sheets

U.S. PATENT DOCUMENTS

| | | | | |
|---|---|---|---|---|
| 6,978,825 B1 | * | 12/2005 | Baylot et al. | 165/45 |
| 7,158,703 B2 | * | 1/2007 | Mjelstad | 385/101 |
| 7,686,073 B1 | * | 3/2010 | Reynolds | 166/65.1 |
| 7,753,111 B1 | * | 7/2010 | Reynolds | 166/65.1 |
| 2007/0007405 A1 | * | 1/2007 | Al-Mayah et al. | 248/200 |
| 2007/0205009 A1 | | 9/2007 | Figenschou | 174/47 |
| 2007/0251694 A1 | | 11/2007 | Ju et al. | 166/345 |
| 2007/0253778 A1 | | 11/2007 | Figenschou | 405/169 |
| 2007/0292214 A1 | * | 12/2007 | Godoy et al. | 405/224.2 |

FOREIGN PATENT DOCUMENTS

| | | |
|---|---|---|
| GB | 2326758 A * | 12/1998 |
| WO | WO 2005124095 A1 * | 12/2005 |

* cited by examiner

UMBILICAL ASSEMBLY, SUBSEA SYSTEM, AND METHODS OF USE

RELATED APPLICATIONS

This application claims priority to co-pending U.S. provisional patent application 60/738,356, filed on Nov. 18, 2005, U.S. provisional patent application 60/738,356 is herein incorporated by reference in its entirety.

FIELD OF INVENTION

The present disclosure relates to an umbilical assembly, a subsea system, and methods of use.

BACKGROUND

The efficient manipulation of subsea structures and devices, such as wellheads, may require an interface between a control or processing facility, such as a platform, a land base facility, or a servicing vessel with a subsea facility, such as a wellhead or a ROV. It is frequently desirable to be able to remotely manipulate valves and other equipment as well as inject various servicing fluids into the subsea facility and to transmit and receive signals and electrical power. Umbilicals may be used to provide this necessary interface.

Many conventional umbilicals incorporate a plurality of internal steel tubes shrouded by an external plastic jacket. The steel tubes may be used to carry hydraulic fluids, hydration inhibitors, such as methanol, or other servicing fluids. In some cases, electrical conductors may be positioned around or within the steel tubes.

Steel as an internal tube material may present one or more disadvantages associated with fatigue strength limitations, bending capacity, weight and/or cost. Shear weight is another disadvantage associated with steel internal tubing in umbilicals. As the weight of the umbilical goes up, more of the total stress capacity of the umbilical must be devoted to tension and thus less is left over for bending stresses. In addition, heavier umbilicals require more robust handling equipment, such as winches, spools and the structures holding them, such as servicing vessels and/or platforms.

Material cost may be another drawback associated with conventional steel umbilicals. Most conventional steel umbilical tubing is fabricated from sophisticated alloys that require complex hot and cold working. As many types of umbilicals may be thousands of feet in length, material costs due to the steel can be large.

U.S. Pat. No. 6,472,614 discloses in an umbilical, one or more steel rods, which provide strength and ballast, are wound helically within the umbilical along with the steel tubes and/or elongated active umbilical elements. These steel rods replace some or all of the thermoplastic filler elements that would otherwise be included within the umbilical. An umbilical may include a plurality of steel tubes helically wound around a core, and at least one substantially solid steel rod helically wound around the core, the steel rod being arranged in a void between the steel tubes. U.S. Pat. No. 6,472,614 is herein incorporated by reference in its entirety.

As the length of the umbilical increases, the weight also increases. At a given length for an umbilical, the steel tubes are no longer able to support the axial stress due to the weight of the umbilical. Making the steel tubes larger or thicker would not be a solution to the depth problem, as larger or thicker steel tubes would be stronger but also heavier, and for a given length, the umbilical would not be able to support its weight. Similarly, adding steel rods would add to the strength, but also the weight of the umbilical, which for a given length for the umbilical would not able to support its weight.

There is a need in the art for umbilicals that have sufficient strength to be used in long length applications.

SUMMARY OF THE INVENTION

One aspect of the invention provides an umbilical assembly comprising at least one elongated umbilical element, and at least one light weight, high strength reinforcing rod.

Another aspect of the invention provides a method of producing oil, comprising drilling a well in a subsea location, installing a wellhead at the subsea location, connecting a first end of an umbilical to the wellhead, connecting a second end of the umbilical to a vessel, wherein the umbilical comprises at least one elongated umbilical element, and at least one light weight, high strength reinforcing rod.

Another aspect of the invention provides a system comprising a subsea facility in a body of water, a vessel in the body of water, and an umbilical connecting the subsea facility with the vessel, the umbilical comprising at least one elongated umbilical element, and at least one light weight, high strength reinforcing rod.

Advantages of the invention may include one or more of the following:

the use of reinforcing rods in combination with metal tubes may increases the tensile capacity of an umbilical;

the use of reinforcing rods may allow installation and continuous dynamic use in deeper water;

the reinforcing rods may reduce the stress in the steel tubes which results in increased service life of the umbilical, since the reinforcing rods may be sufficient for absorbing the tensile loading;

the conventional steel tubes in the umbilical can be designed merely to resist collapsing pressure only, resulting in a decrease in the wall thickness of the tube and consequently a decrease in manufacturing cost;

the reinforcing rods may be assembled in the same manufacturing pass as the conventional steel tubes, which avoids the need of an additional manufacturing process for armoring, and consequently the need for an armoring machine;

the invention can be used both in static, deepwater applications when substantial loading is to be applied to the umbilical, and in dynamic applications, any number of reinforcing rods can be provided in order to obtain the benefits of the invention, the only limitation being the amount of empty space available given the conduits, steel tubes and other elements needed in the umbilical.

DETAILED DESCRIPTION OF THE INVENTION

Figure 1:
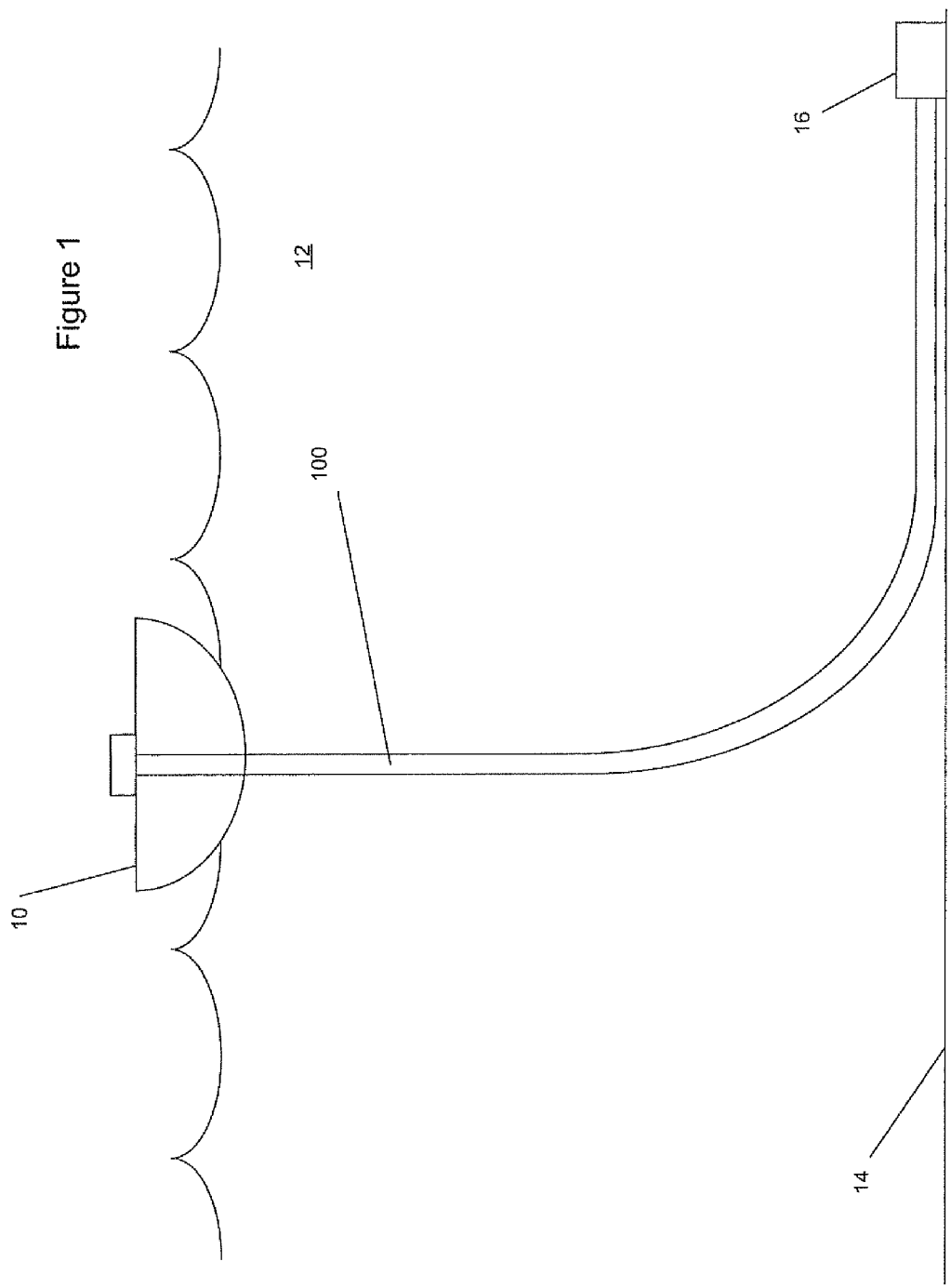
FIG. 1 illustrates a system for use with an umbilical.

In one embodiment, there is disclosed an umbilical assembly comprising at least one elongated umbilical element, and at least one light weight, high strength reinforcing rod. In some embodiments, the elongated umbilical elements are selected from the group consisting of steel tubes, power or signaling bundles, and optical fibers. In some embodiments, the assembly also includes an outer sheath. In some embodiments, the elongated umbilical elements and the reinforcement rods are helically wound. In some embodiments, the reinforcing rod comprises a strength to weight ratio of at least $0.6 \times 10^6$ N-m/kg. In some embodiments, the at least one reinforcing rod comprises a material selected from the group consisting of e-glass fiber, ceramic fiber, ultra high modulus carbon fiber, high modulus carbon fiber, boron fiber, s-glass fiber, aromatic polyamide fiber, high strength carbon fiber, and liquid crystal fiber.

In one embodiment, there is disclosed a method of producing oil, comprising drilling a well in a subsea location, installing a wellhead at the subsea location, connecting a first end of an umbilical to the wellhead, connecting a second end of the umbilical to a vessel, wherein the umbilical comprises at least one elongated umbilical element, and at least one light weight, high strength reinforcing rod. In some embodiments, the wellhead is at a depth of least about 2000 meters. In some embodiments, the vessel comprises a floating production ship or a floating production platform. In some embodiments, the umbilical is used to control the wellhead, inject one or more liquids into the wellhead, provide power to the wellhead, monitor conditions at the wellhead, or transport fluids away from the wellhead. In some embodiments, the method also includes producing a formation fluid from the wellhead to the vessel.

In one embodiment, there is disclosed a system comprising a subsea facility in a body of water, a vessel in the body of water, and an umbilical connecting the subsea facility with the vessel, the umbilical comprising at least one elongated umbilical element, and at least one light weight, high strength reinforcing rod.

Umbilicals may include one or more types of elongated active umbilical elements, such as pipes, electrical cables, optical fiber cables, or hoses, grouped together for flexibility and over-sheathed and/or armored for mechanical strength and ballast. Umbilicals may be used for transmitting power, signals and fluids (fluid injection, hydraulic power, gas release, etc.) to and from a subsea installation via the various elongated umbilical elements. One use of umbilicals is the transmission of electrical power to electrical devices on the seabed, for depths of up to 2000 meters or more.

The elements may be arranged within the umbilical symmetrically. The cross-section may be circular. In order to fill the interstitial voids between the various umbilical elements and obtain the desired circular configuration, filler components may be included within the voids.

Electrical and/or optical fiber cables may not be designed to resist the loads applied to the umbilical. These hoses and tubes, generally made of thermoplastic material or steel, may be designed merely to resist collapse.

The umbilical elements may be wound together in an S-Z configuration. Then this bundle may be over-sheathed. Additional layers of armoring (steel or Kevlar, for example) may be wound around this bundle. Then an external thermoplastic sheath may be applied.

Steel tubes and other elongated umbilical elements that make up the umbilical may be wound in a helical pattern around a central core. The core may be a flexible plastic tube, a larger steel tube, or one of the elongated umbilical elements. The steel tubes may be plastically deformed by the winding so they do not unwind.

Under some conditions (such as use in deep water and/or in dynamic applications), increased loads will be applied to the umbilical, due to the weight of the umbilical and to the dynamic movement of water. Strengthening elements and ballast elements may be added to the umbilical to withstand these loads. Armoring wires may be wound helically around the umbilical.

Referring first to FIG. 1, there is illustrated an umbilical 100 in a body of water 12, which is connecting vessel 10 with subsea facility 16 adjacent the bottom 14 of body of water 12. Vessel 10 and/or subsea facility 16 may be permanently installed or movable within the body of water 12. Body of water 12 has a depth measured as a vertical distance from subsea facility 16 to the surface of body of water 12.

Figure 2:
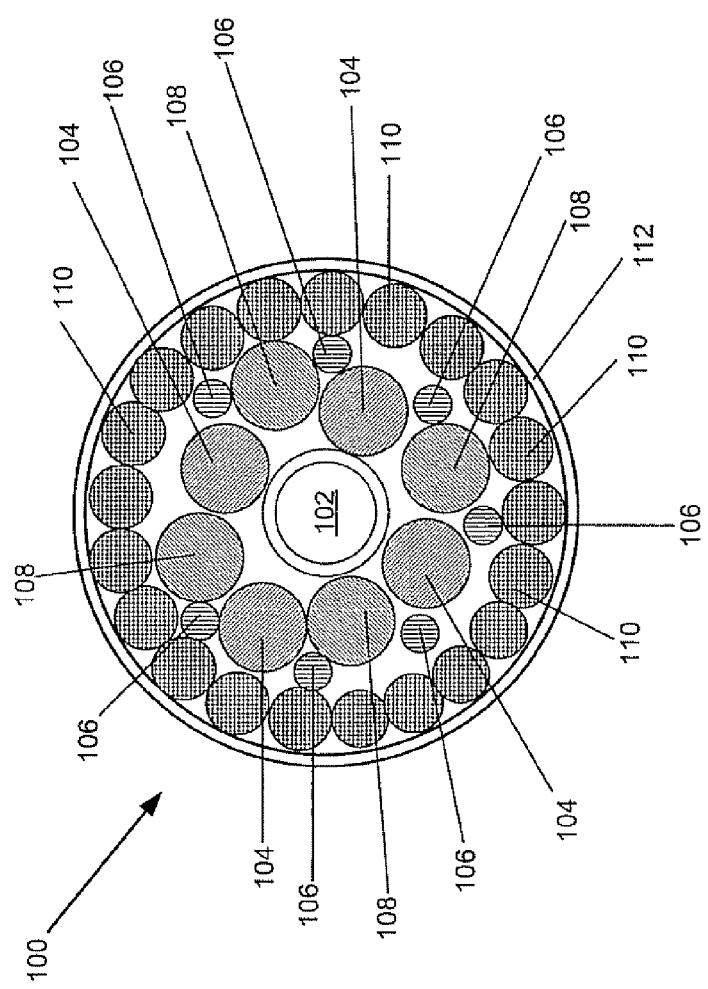
FIG. 2 illustrates a cross section of an umbilical.

Referring now to FIG. 2, there is illustrated a cross-section of umbilical 100. This umbilical 100 includes central core 102. The central core 102 may be made of steel for transporting fluid, or, for transporting electrical power. Alternatively, core 102 may be made of metallic strand over-sheathed with a thermoplastic material. Disposed around core 102 may be one or more steel tubes 104 for transporting fluid; one or more optical fiber cables 106; one or more armored electric power and/or signaling bundles 108; armoring wires 110; and an outer sheath 112.

The steel tubes 104, optical fiber cables 106, bundles 108, and armoring wires 110 may be stranded together around the central core 102 by means of a helix machine. The resulting bundle may then be coated with outer sheath 112.

Thermoplastic fillers may be used to fill the interstices between the several components of the umbilical in order to provide a circularly symmetrical arrangement.

The steel tubes 104 may be designed to resist collapse pressure and also to resist tensile loading. The outside armor layers 110 may provide additional strength and/or ballast.

The steel tubes 104 may be made of carbon steel or stainless steel, for example. They may be thermoplastic coated or zinc coated in order to provide corrosion resistance.

The outer sheath 112 may be made by extrusion of thermoplastic (such as polyethylene or polypropylene) or may be woven (e.g., polypropylene yarn). Sacrificial anodes may also be included within the umbilical 100.

In order to achieve the requirements for use under severe conditions, such as depth, it would be conceivable to increase the wall thickness of the tubes 104. However, increasing the wall thickness of the steel tubes may lead to: the flexibility of the umbilical 100 may be reduced, the manufacture of the umbilical 100 may become more difficult or even impossible, and/or increased weight.

In order to achieve the requirements for use under severe conditions, it would be conceivable to add additional layers of armoring 110. Adding additional layers of armoring 110 may lead to: the outer diameter of the umbilical 100 increases, which may lead to an increase in the hydrodynamic drag area, the manufacturing cost increases, since an armoring machine is needed for the armor layers and the number of manufacturing passes is increased as well, and/or increased weight.

Figure 3:
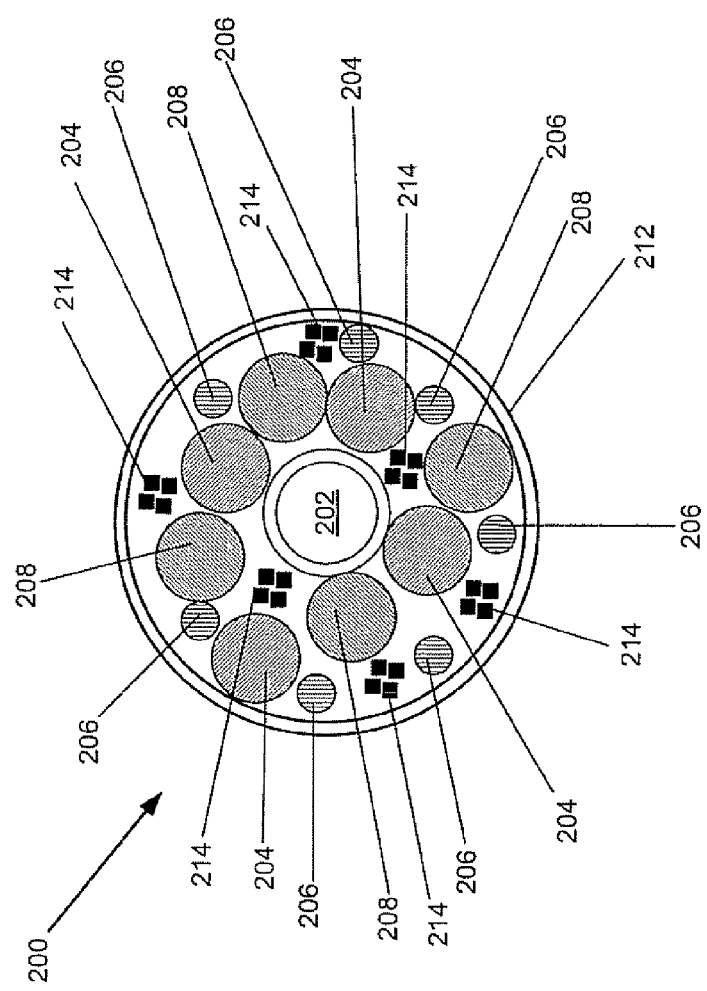
FIG. 3 illustrates a cross section of an umbilical.

Referring now to FIG. 3, in one embodiment of the invention, there is illustrated a cross-section of umbilical 200, which may be used instead of umbilical 100. This umbilical 200 includes central core 202. The central core 202 may be made of steel for transporting fluid, or, for transporting electrical power. Core 202 may be made of metallic strand over-sheathed with a thermoplastic material. Disposed around core 202 may be one or more steel tubes 204 for transporting fluid; one or more optical fiber cables 206; one or more armored electric power and/or signaling bundles 208; reinforcing rods 214; and an outer sheath 212.

The steel tubes 204, optical fiber cables 206, bundles 208, and reinforcing rods 214 may be stranded together around the central core 202 by means of a helix machine. The resulting bundle may then be coated with outer sheath 212.

Thermoplastic fillers may be used to fill the interstices between the several components of the umbilical in order to provide a circularly symmetrical arrangement.

The steel tubes 204 may be designed to resist collapse pressure and also to resist tensile loading. The reinforcing rods 214 may provide additional strength and/or ballast.

The steel tubes 204 may be made of carbon steel or stainless steel, for example. They may be thermoplastic coated or zinc coated in order to provide corrosion resistance.

The outer sheath 212 may be made by extrusion of thermoplastic (such as polyethylene or polypropylene) or may be woven (e.g., polypropylene yarn). Sacrificial anodes may also be included within the umbilical 200.

One or more reinforcing rods 214 may be wound helically within the umbilical along with steel tubes 204 and/or other elongated active umbilical elements. These reinforcing rods 214 may replace some or all of the thermoplastic filler elements that would otherwise be included within the umbilical.

In some embodiments, reinforcing rods 214 have a diameter from about 0.5 to about 50 mm. These reinforcing rods 214 may be designed to absorb the tensile loading and/or to ballast the umbilical.

The reinforcing rods 214 may be made of any suitable high strength low density material. In some embodiments, suitable high strength low density material include materials having a specific tensile strength greater than about $0.6 \times 10^6$ N-m/kg. In some embodiments, suitable high strength low density material include materials having a specific tensile strength greater than about $1.0 \times 10^6$ N-m/kg. In some embodiments, suitable high strength low density material include materials having a specific tensile strength greater than about $1.5 \times 10^6$ N-m/kg. In some embodiments, suitable high strength low density material include materials having a specific tensile strength greater than about $2.0 \times 10^6$ N-m/kg. In some embodiments, suitable high strength low density material include materials having a specific tensile strength up to about $10.0 \times 10^6$ N-m/kg.

In some embodiments, typical values of specific tensile strength for steel is $0.5 \times 10^6$ N-m/kg, for aluminum is $0.2 \times 10^6$ N-m/kg, for E-glass fiber is $0.9 \times 10^6$ N-m/kg, for ceramic fiber is from $0.8\text{-}12 \times 10^6$ N-m/kg, for ultrahigh modulus carbon fiber is $1\text{-}1 \times 10^6$ N-m/kg, for high modulus carbon fiber is $1.2\text{-}1.4 \times 10^6$ N-m/kg, for boron fiber is $1.4 \times 10^6$ N-m/kg, for S-glass fiber is $1.8 \times 10^6$ N-m/kg, for Kevlar 29 or 49 (commercially available from DuPont) is $2.5 \times 10^6$ N-m/kg, for aromatic polyamide (aramid) fiber is $2.5 \times 10^6$ N-m/kg, for high strength carbon or graphite fiber is $2.5 \times 10^6$ N-m/kg, and for liquid crystal (ordered polymer) fiber is $2.6 \times 10^6$ N-m/kg.

In some embodiments, reinforcing rods 214 may be made of E-glass fiber, ceramic fiber, ultrahigh modulus carbon fiber, high modulus carbon fiber, boron fiber, S-glass fiber, Kevlar 29 or 49 (commercially available from DuPont), aromatic polyamide (aramid) fiber, high strength carbon or graphite fiber, and/or liquid crystal (ordered polymer) fiber.

In some embodiments, reinforcing rods 214 may be in groups from about 1 to about 100 fibers, for example groups from about 3 to about 10 fibers.

In some embodiments, reinforcing rods 214 may be substantially solid. In this context, "substantially solid" means that the reinforcing rods may be completely solid, or may be dense enough to provide enough strength to obtain the advantages of the invention.

In some embodiments, umbilical 200 may be used in water 112 having a depth of at least about 2000 meters. In some embodiments, umbilical 200 may be used in water 112 having a depth of at least about 2500 meters. In some embodiments, umbilical 200 may be used in water 112 having a depth of at least about 3000 meters. In some embodiments, umbilical 200 may be used in water 112 having a depth of at least about 3500 meters. In some embodiments, umbilical 200 may be used in water 112 having a depth of at least about 4000 meters. In some embodiments, umbilical 200 may be used in water 112 having a depth of up to about 10,000 meters.

Advantages of the invention may include one or more of the following: the use of reinforcing rods in combination with metal tubes increases the tensile capacity of an umbilical, allowing installation and continuous dynamic use in deeper water, the reinforcing rods may reduce the stress in the steel tubes which results in increased service life of the umbilical, since the reinforcing rods may be sufficient for absorbing the tensile loading, the conventional steel tubes in the umbilical can be designed merely to resist collapsing pressure only, resulting in a decrease in the wall thickness of the tube and consequently a decrease in manufacturing cost, the reinforcing rods may be assembled in the same manufacturing pass as the conventional steel tubes, which avoids the need of an additional manufacturing process for armoring, and consequently the need for an armoring machine, the invention can be used both in static, deepwater applications when substantial loading is to be applied to the umbilical, and in dynamic applications, any number of reinforcing rods can be provided in order to obtain the benefits of the invention, the only limitation being the amount of empty space available given the conduits, steel tubes and other elements needed in the umbilical.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. An umbilical assembly comprising:
   at least one elongated umbilical element; and
   at least one light weight, high strength reinforcing rod disposed adjacent to the at least one elongated umbilical element;
   wherein the reinforcing rod comprises a strength to weight ratio of at least $0.6 \times 10^6$ N-m/kg;
   further comprising an outer sheath disposed around the at least one elongated umbilical element and the at least one light weight, high strength reinforcing rod.

2. The assembly of claim 1, wherein the elongated umbilical elements are selected from the group consisting of steel tubes, power or signaling bundles, and optical fibers.

3. The assembly of claim 1, wherein the at least one reinforcing rod comprises a material selected from the group consisting of e-glass fiber, ceramic fiber, ultra high modulus carbon fiber, high modulus carbon fiber, boron fiber, s-glass fiber, aromatic polyamide fiber, high strength carbon fiber, and liquid crystal fiber.

4. An umbilical assembly comprising:
   at least one elongated umbilical element;
   at least one light weight, high strength reinforcing rod; and
   an outer sheath disposed around the at least one elongated umbilical element and the at least one light weight, high strength reinforcing rod,
   wherein the reinforcing rod comprises a strength to weight ratio of at least $0.6 \times 10^6$ N-m/kg,
   wherein the at least one light weight, high strength reinforcing rod is wound with the at least one elongated umbilical element, wherein the at least one light weight, high strength reinforcing rod and the at least one elongated umbilical element are disposed eccentrically.

5. The assembly of claim 4, wherein the at least one light weight, high strength reinforcing rod is wound in a helical configuration with the at least one elongated umbilical element.

6. The assembly of claim 4, wherein the at least one light weight, high strength reinforcing rod is wound in a S-Z configuration with the at least one elongated umbilical element.

* * * * *